US012808483B2

(12) United States Patent
Rak

(10) Patent No.: US 12,808,483 B2
(45) Date of Patent: Nov. 24, 2026

(54) PUMP ASSEMBLY

(71) Applicant: Pratt & Whitney Canada Corp., Longueuil (CA)

(72) Inventor: Paweł Rak, Rzeszów (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/987,630

(22) Filed: Dec. 19, 2024

(65) Prior Publication Data

US 2026/0177203 A1 Jun. 25, 2026

(51) Int. Cl.
*F16N 13/20* (2006.01)
*F04D 13/02* (2006.01)

(52) U.S. Cl.
CPC ........... *F16N 13/20* (2013.01); *F04D 13/021* (2013.01); *F16N 2210/02* (2013.01); *F16N 2210/08* (2013.01)

(58) Field of Classification Search
CPC ..... F16N 13/20; F16N 2210/02; F04D 13/021
See application file for complete search history.

(56) References Cited

U.S. PATENT DOCUMENTS

| | | | | |
|---|---|---|---|---|
| 2,665,638 A * | 1/1954 | Lauck | F04C 14/28 | 417/319 |
| 3,528,756 A * | 9/1970 | Keresman, Jr. | F04C 15/0026 | 418/102 |
| 11,365,731 B2 * | 6/2022 | Einfalt | F04C 2/084 | |
| 2005/0063851 A1 | 3/2005 | Phillips | | |
| 2020/0232388 A1 | 7/2020 | Alecu et al. | | |

FOREIGN PATENT DOCUMENTS

KR 102177683 B1 11/2020

OTHER PUBLICATIONS

Extended European Search Report for EP Application No. 25226019.5; Issue date, Apr. 24, 2026, 11 pages.

* cited by examiner

*Primary Examiner* — Anthony Ayala Delgado
(74) *Attorney, Agent, or Firm* — CANTOR COLBURN LLP

(57) ABSTRACT

A pump assembly of an aircraft engine includes a pump housing, a first pump stage positioned in the housing and including two first stage rotating elements meshed at a first mesh location, and a second pump stage positioned in the housing and including two second stage rotating elements meshed at a second mesh location. The first stage rotating elements are retained at respective shafts by one or more woodruff keys, and at least one second stage rotating element of the two second stage rotating elements is secured at its respective shaft via a spline connection of the at least one second stage rotating element to the respective shaft.

14 Claims, 2 Drawing Sheets

PUMP ASSEMBLY

BACKGROUND

Exemplary embodiments pertain to the art of pumps and in particular to multistage pumps for aircraft engines.

Aircraft engines, such as gas turbine engines, typically include one or more pumps. Such pumps may be utilized for pumping oil to operate components of the aircraft engine, supplying oil to engine systems, for pumping an air/oil mixture from an oil sump, or from an airframe or engine mounted gearbox, for example. Various engine configurations mat provide limited space for such pumps, and the size or dimensions of some pump configurations, such as multi-stage pumps, may limit engine design choices. In typical pumps, the pump gears are retained to respective shafts utilizing woodruffs, but these connections have limited contact area at the woodruff, resulting in wear of the woodruff.

BRIEF DESCRIPTION

In one exemplary embodiment, a pump assembly of an aircraft engine includes a pump housing, a first pump stage positioned in the housing and including two first stage rotating elements meshed at a first mesh location, and a second pump stage positioned in the housing and including two second stage rotating elements meshed at a second mesh location. The first stage rotating elements are retained at respective shafts by one or more woodruff keys, and at least one second stage rotating element of the two second stage rotating elements is secured at its respective shaft via a spline connection of the at least one second stage rotating element to the respective shaft.

Additionally or alternatively, in this or other embodiments the at least one second stage rotating element includes an element flange extending axially from the at least one second stage rotating element. The element flange at least partially defines the spline connection.

Additionally or alternatively, in this or other embodiments a journal bearing is defined by an outer surface of the element flange and the housing.

Additionally or alternatively, in this or other embodiments the at least one second stage rotating element and a first stage rotating element of the two first stage rotating elements share a common shaft.

Additionally or alternatively, in this or other embodiments a separator wall of the housing is positioned between the at least one second stage rotating element and the first stage rotating element.

Additionally or alternatively, in this or other embodiments a drive gear is operably connected to the common shaft.

Additionally or alternatively, in this or other embodiments the first stage rotating elements and the second stage rotating elements are gears.

In another exemplary embodiment, a pump assembly for an aircraft engine includes a housing, a first shaft positioned in the housing, and a second shaft positioned in the housing. Two first stage gears are positioned in the housing. A first first stage gear of the two first stage gears is positioned along the first shaft and a second first stage gear of the two first stage gears is positioned along the second shaft. The two first stage gears are meshed-in at a first mesh location. Two second stage gears are positioned in the housing. A first second stage gear of the two second stage gears are positioned along the first shaft and a second second stage gear of the two second stage gears dis located along the second shaft. The two second stage gears are meshed-in at a second mesh location. The two first stage gears are retained at their respective shafts by one or more woodruff keys, and the first second stage gear is secured at the first shaft via a spline connection of the first second stage gear to the first shaft.

Additionally or alternatively, in this or other embodiments a gear flange extends axially from the first second stage gear. The gear flange at least partially defines the spline connection.

Additionally or alternatively, in this or other embodiments a journal bearing is defined by an outer surface of the gear flange and the housing.

Additionally or alternatively, in this or other embodiments a separator wall of the housing is positioned between the first first stage gear and the first second stage gear.

Additionally or alternatively, in this or other embodiments a drive gear is operably connected to the first shaft.

Additionally or alternatively, in this or other embodiments rotation of the first shaft urges rotation of the second first stage gear and second second stage gear.

Additionally or alternatively, in this or other embodiments the second shaft includes a shaft protrusion at least partially overlapping the second second stage gear to axially retain the second second stage gear on the second shaft.

In yet another exemplary embodiment, a gas turbine engine system includes a gas turbine engine, and a pump operably connected to the gas turbine engine to provide a fluid flow to the gas turbine engine. The pump includes a housing, a first shaft positioned in the housing, and a second shaft positioned in the housing. Two first stage gears are positioned in the housing. A first first stage gear of the two first stage gears is positioned along the first shaft and a second first stage gear of the two first stage gears is positioned along the second shaft. The two first stage gears are enmeshed at a first mesh location. Two second stage gears are located in the housing. A first second stage gear of the two second stage gears is positioned along the first shaft and a second second stage gear of the two second stage gears is positioned along the second shaft. The two second stage gears are enmeshed at a second mesh location. The two first stage gears are retained at their respective shafts by one or more woodruff keys, and the first second stage gear is secured at the first shaft via a spline connection of the first second stage gear to the first shaft.

Additionally or alternatively, in this or other embodiments a gear flange extends axially from the first second stage gear. The gear flange at least partially defines the spline connection.

Additionally or alternatively, in this or other embodiments a journal bearing is defined by an outer surface of the gear flange and the housing.

Additionally or alternatively, in this or other embodiments a separator wall of the housing is located between the first first stage gear and the first second stage gear.

Additionally or alternatively, in this or other embodiments a drive gear is operably connected to the first shaft.

Additionally or alternatively, in this or other embodiments the second shaft includes a shaft protrusion at least partially overlapping the second second stage gear to axially retain the second second stage gear on the second shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
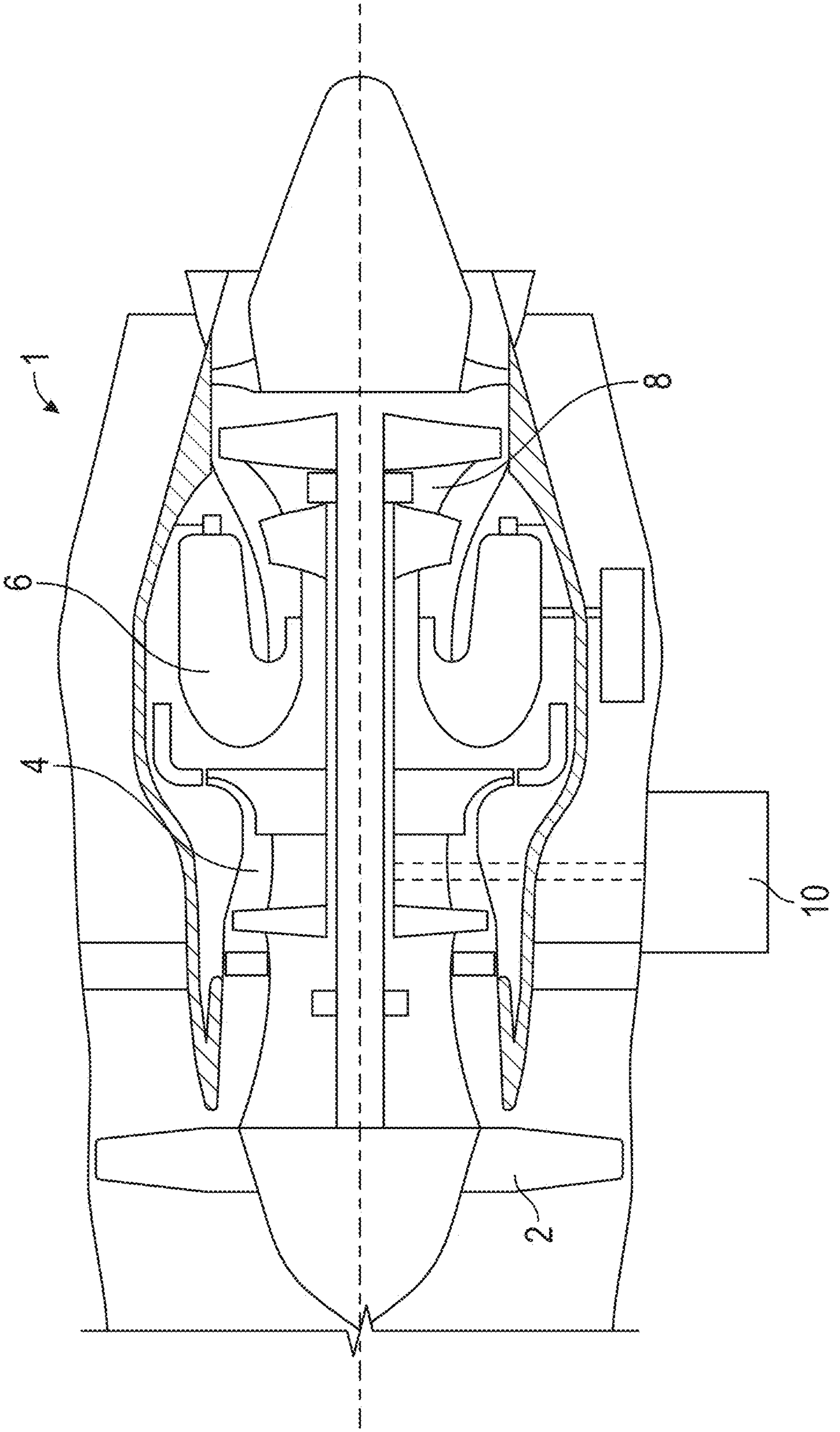
FIG. 1 is a partial cross-sectional view of an embodiment of a gas turbine engine.

FIG. 1 illustrates a gas turbine engine 1 of a type preferably provided for use in subsonic flight, generally comprising in serial flow communication a fan 2 through which ambient air is propelled, a compressor section 4 for pressurizing the air, a combustor 6 in which the compressed air is mixed with fuel and ignited for generating an annular stream of hot combustion gases, and a turbine section 8 for extracting energy from the combustion gases.

Aircraft engines, including the type of engine shown in FIG. 1, typically have one or more pumps 10 to perform different pumping functions. As an example, one or more pumps may be used to discharge or scavenge oil (oil, air/oil mixture or other fluids) to/from one or more engine components. Aircraft engines may have a single pump (or pump assembly) to limit the space (volume) of the aircraft engines dedicated to such component. Such pump(s) may include multiple pump stages to feed and/or scavenge fluid to/from different areas in the aircraft engine.

Figure 2:
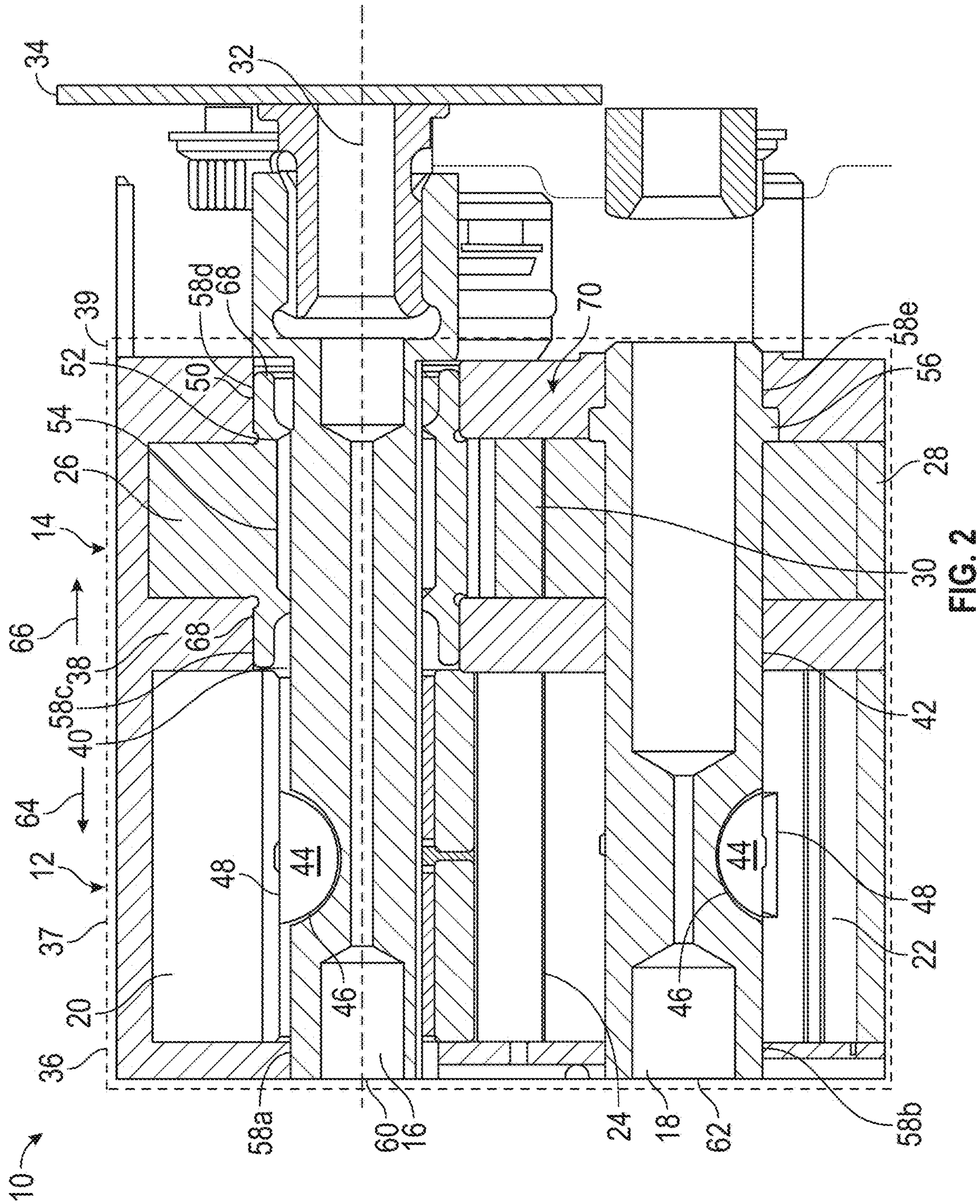
FIG. 2 is a cross-sectional view of an embodiment of a pump assembly of a gas turbine engine.

An exemplary pump 10 (or pump assembly 10) is shown in the cross-section of FIG. 2. The pump assembly 10 includes a first pump stage 12 and a second pump stage 14 stacked along shafts 16 and 18, thereby defining an axial pump architecture. While the pump assembly 10 illustrated in FIG. 2 is a two-stage pump, one skilled in the art will readily appreciate that other multi-stage pump configurations, such as a three-stage, four-stage or five-stage pump assembly 10 is contemplated within the scope of the present disclosure. The first pump stage 12 has a first stage rotating elements 20 and 22 mounted on shafts 16 and 18, respectively. The first stage rotating elements 20 and 22 are toothed gears, having a plurality of gear teeth (not shown for clarity), which mesh-in at a first mesh location 24. The first stage rotating elements 20 and 22 are meshed such that rotation of the rotating element 20 transmits rotational energy to the rotating element 22. Similarly, the second pump stage 14 has second stage rotating elements 26 and 28 mounted on shafts 16 and 18, respectively, and are axially spaced apart from the first stage rotating elements 20 and 22. The second stage rotating elements 26 and 28 are toothed gears, having a plurality of gear teeth (not shown for clarity), which mesh-in at a second mesh location 30. The second stage rotating elements 26 and 28 are meshed such that rotation of the rotating element 26 transmits rotational energy to the rotating element 28. The shaft 16 is configured as an input shaft, such that the shaft 16 is driven to rotate about a shaft axis 32 by a power input gear 34 operably connected to the shaft 16.

The first pump stage 12 and the second pump stage 14 are located in a common pump housing 36, with a separator wall 38 located between the first pump stage 12 and the second pump stage 14, which includes wall openings 40 and 42 for passage of the shafts 16 and 18 through the separator wall 38. In some embodiments, the pump housing 36 includes a housing body 37 and a housing endcap 39 installed over the housing body 37, allowing for installation of components of the pump 10 into the pump housing 36.

First stage rotating element 20 is mounted on shaft 16 utilizing one or more woodruff keys 44. The woodruff key 44 is inserted into a shaft opening 46 of the shaft 16 and into a corresponding gear opening 48 of the first stage rotating element 20 to angularly locate and retain the first stage rotating element 20 on the shaft 16. First stage rotating element 22 is similarly mounted on shaft 18 utilizing one or more woodruff keys 44. The woodruff key 44 is inserted into a shaft opening 46 of the shaft 18 and into a corresponding gear opening 48 of the first stage rotating element 22 to angularly locate and retain the first stage rotating element 22 on the shaft 18.

Second stage rotating element 26 includes a gear flange 50 upon which the second stage rotating element 26 is centered. The gear flange 50 includes a plurality of gear spline teeth 52 configured to engage with a corresponding plurality of shaft spline teeth 54 of the shaft 16. Thus, the second stage rotating element 26 is mounted to the shaft 16 via the spline connection 70 defined by the gear spline teeth 52 and the shaft spline teeth 54. The second stage rotating element 28 is installed to the shaft 18 and is axially located and retained on the shaft 18 between the separator wall 38 and a shaft protrusion 56 extending radially outboard from the shaft 18, and at least partially radially overlaps the second stage rotating element 28.

The shafts 16 and 18 are supported in the pump housing 36 via a plurality of journal bearings 58. The shaft 16 is supported by journal bearing **58*a* located at shaft end 60 of the shaft 16, so that the first stage rotating element 20 is located between journal bearing 58*a* and the separator wall 38. Journal bearing 58*a* is defined by the shaft 16 and the housing 36. Similarly, shaft 18 is supported by journal bearing 58*b* located at a shaft end 62 of the shaft 18, so that the first stage rotating element 22 is located between the journal bearing 58*b* and the separator wall 38. Journal bearing 58*b* is defined by the shaft 18 and the housing 36**.

Shaft 16 is additionally supported by spline 52 and corresponding gear 26 which is supported by journal bearings **58*c* and 58*d*. As stated above, second stage rotating element 26 includes gear flange 50, which extends axially from the second stage rotating element 26 along the shaft 16 in both a first direction 64 and a second direction 66 opposite the first direction 64. Journal bearing 58*c* is located along the shaft 16 between the first stage rotating element 20 and the second stage rotating element 26, and is defined by a flange outer surface 68 of the gear flange 50 and the separator wall 38. With the journal bearing 58*c* defined as above, the journal bearing 58*c* is radially offset from the shaft 16 thus reducing or eliminating a leakage path along the shaft 16 from the second stage rotating element 26 to the first stage rotating element 20**.

Journal bearing **58*d* is located along the shaft 16 such that the second stage rotating element 26 is between journal bearing 58*c* and the journal bearing 58*d*, and is and defined by a flange outer surface 68 of the gear flange 50 and the housing 36. Shaft 18 is also supported by journal bearing 58*e*, defined between the shaft 18 and the housing 36, and in some embodiments located such that the shaft protrusion 56 is located between the second stage rotating element 28 and the journal bearing 58*e***.

Use of the spline connection 52/54 improves torque transfer in the pump assembly 10, reduces repair cost due to reduced wear of woodruff keys, and additionally reduces leakage between the second stage rotating element 26 and the first stage rotating element 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pump assembly of an aircraft engine, comprising:

a pump housing;

a first pump stage disposed in the housing and including two first stage rotating elements meshed at a first mesh location;

a second pump stage disposed in the housing and including two second stage rotating elements meshed at a second mesh location;

wherein the first stage rotating elements are retained at respective shafts by one or more woodruff keys; and wherein at least one second stage rotating element of the two second stage rotating elements is secured at its respective shaft via a spline connection of the at least one second stage rotating element to the respective shaft;

wherein the at least one second stage rotating element includes an element flange extending axially from the at least one second stage rotating element, the element flange at least partially defining the spline connection;

further comprising a first journal bearing supportive of the respective shaft defined by the pump housing and the respective shaft; and further comprising a second journal bearing defined by an outer surface of the element flange and the housing, the second journal bearing radially offset from the first journal bearing.

2. The pump assembly of claim 1, wherein the at least one second stage rotating element and a first stage rotating element of the two first stage rotating elements share a common shaft.

3. The pump assembly of claim 2, further comprising a separator wall of the housing disposed between the at least one second stage rotating element and the first stage rotating element.

4. The pump assembly of claim 2, further comprising a drive gear operably connected to the common shaft.

5. The pump assembly of claim 1, wherein the first stage rotating elements and the second stage rotating elements are gears.

6. A pump assembly for an aircraft engine, comprising:

a housing:

a first shaft disposed in the housing;

a second shaft disposed in the housing;

two first stage gears disposed in the housing, a first first stage gear of the two first stage gears disposed along the first shaft and a second first stage gear of the two first stage gears disposed along the second shaft, the two first stage gears meshed-in at a first mesh location;

two second stage gears disposed in the housing, a first second stage gear of the two second stage gears disposed along the first shaft and a second second stage gear of the two second stage gears disposed along the second shaft, the two second stage gears meshed-in at a second mesh location;

wherein the two first stage gears are retained at their respective shafts by one or more woodruff keys; and wherein the first second stage gear is secured at the first shaft via a spline connection of the first second stage gear to the first shaft;

further comprising a gear flange extending axially from the first second stage gear, the gear flange at least partially defining the spline connection;

further comprising a first journal bearing supportive of the first shaft defined by the housing and the first shaft; and further comprising a second journal bearing defined by an outer surface of the gear flange and the housing, the second journal bearing radially offset from the first journal bearing.

7. The pump assembly of claim 6, further comprising a separator wall of the housing disposed between the first first stage gear and the first second stage gear.

8. The pump assembly of claim 6, further comprising a drive gear operably connected to the first shaft.

9. The pump assembly of claim 6, where rotation of the first shaft urges rotation of the second first stage gear and second second stage gear.

10. The pump assembly of claim 6, wherein the second shaft includes a shaft protrusion at least partially overlapping the second second stage gear to axially retain the second second stage gear on the second shaft.

11. A gas turbine engine system, comprising:

a gas turbine engine;

a pump operably connected to the gas turbine engine to provide a fluid flow to the gas turbine engine, the pump including:

a housing:

a first shaft disposed in the housing;

a second shaft disposed in the housing;

two first stage gears disposed in the housing, a first first stage gear of the two first stage gears disposed along the first shaft and a second first stage gear of the two first stage gears disposed along the second shaft, the two first stage gears enmeshed at a first mesh location;

two second stage gears disposed in the housing, a first second stage gear of the two second stage gears disposed along the first shaft and a second second stage gear of the two second stage gears disposed along the second shaft, the two second stage gears enmeshed at a second mesh location;

wherein the two first stage gears are retained at their respective shafts by one or more woodruff keys; and wherein the first second stage gear is secured at the first shaft via a spline connection of the first second stage gear to the first shaft;

further comprising a gear flange extending axially from the first second stage gear, the gear flange at least partially defining the spline connection;

further comprising a first journal bearing supportive of the first shaft defined by the housing and the first shaft; and further comprising a second journal bearing defined by an outer surface of the gear flange and the housing, the second journal bearing radially offset from the first journal bearing.

12. The engine system of claim 11, further comprising a separator wall of the housing disposed between the first first stage gear and the first second stage gear.

13. The engine system of claim 11, further comprising a drive gear operably connected to the first shaft.

14. The engine system of claim 11, wherein the second shaft includes a shaft protrusion at least partially overlapping the second second stage gear to axially retain the second second stage gear on the second shaft.

* * * * *